United States Patent [19]

Boggiatto

[11] Patent Number: 5,737,136
[45] Date of Patent: Apr. 7, 1998

[54] OSCILLATING SIDE VIEW MIRROR

[76] Inventor: Eugene Boggiatto, 11779 Cypress St., Castorville, Calif. 95012

[21] Appl. No.: 608,009

[22] Filed: Mar. 4, 1996

[51] Int. Cl.⁶ .............................. G02B 5/08; G02B 7/182; B60R 1/06
[52] U.S. Cl. .......................... 359/843; 359/872; 359/877
[58] Field of Search ............................... 359/843, 844, 359/872, 877, 604, 607

[56] References Cited

U.S. PATENT DOCUMENTS

| | | | |
|---|---|---|---|
| 3,493,295 | 2/1970 | Kobrehel | 359/877 |
| 3,575,496 | 4/1971 | Pollock | 359/844 |
| 3,628,862 | 12/1971 | Stephenson | 359/877 |
| 3,711,179 | 1/1973 | Takeda | 359/508 |
| 3,799,658 | 3/1974 | Pignatelli | 359/844 |
| 4,105,301 | 8/1978 | Doeg | 359/877 |
| 4,283,117 | 8/1981 | Ellis | 359/607 |
| 4,318,590 | 3/1982 | Hanley | 359/844 |
| 4,938,577 | 7/1990 | Sugita | 359/843 |
| 4,955,704 | 9/1990 | Janowicz | 359/843 |
| 5,189,561 | 2/1993 | Hong | 359/843 |

*Primary Examiner*—Ricky D. Shafer

[57] ABSTRACT

A oscillating side view mirror including a mirror housing that is supported on a side of a vehicle by a generally rectangular support arm. A motor is mounted within a hollow interior of the support arm, and a drive wheel. The motor has a pair of contact wires that are in electrical communication with a turn signal of the vehicle by a relay. A mirror is positioned within the housing. The mirror is supported within the housing by a backing plate with a rotation rod extending therethrough. Lastly, a generally rectangular arm is attached to the drive wheel of the motor, and a oscillating member that is attached to the rotation rod. The arm is capable of causing the mirror to rotate back and forth within the mirror housing, when the motor is activated by a turn signal of the vehicle sending an electrical current through the relay.

6 Claims, 3 Drawing Sheets

5,737,136

OSCILLATING SIDE VIEW MIRROR

BACKGROUND OF THE INVENTION

1. Field of the Invention

The present invention relates to a oscillating side view mirror and more particularly pertains to allowing the mirror to oscillate automatically when the turn signal is in operation, and further having the side mirror that oscillates automatically in correspondence with the direction of the turn signal.

2. Description of the Prior Art

The use of a side view mirror is known in the prior art. More specifically, side view mirrors heretofore devised and utilized for the purpose of improving the left and right side viewing of the vehicle are known to consist basically of familiar, expected, and obvious structural configurations, notwithstanding the myriad of designs encompassed by the crowded prior art which has been developed for the fulfillment of countless objectives and requirements.

By way of example, U.S. Pat. No. 5,249,083 to Doughtie and Sharpe, Sr. discloses an automatically controlled mirror. U.S. Pat. No. 5,189,561 to Hong discloses an automatic oscillating vehicle mirror. U.S. Pat. No. 5,159,497 to Lynas discloses a solenoid controlled rearview mirror. U.S. Pat. No. 5,097,362 to Lynas discloses a rearview mirror targeting and repositioning system. U.S. Pat. Des. 316,996 to Swauger discloses an auto rearview safety mirror. Lastly, U.S. Pat. No. 4,955,704 to Janowicz discloses a shiftable outside rearview mirror for use on vehicles.

While these devices fulfill their respective, particular objectives and requirements, the aforementioned patents do not describe oscillating side view mirror that allows the side view mirror of the vehicle, to oscillate automatically, when the turn signal of the vehicle is activated by the vehicle operator.

In this respect, the oscillating side view mirror according to the present invention substantially departs from the conventional concepts and designs of the prior art, and in doing so provides an apparatus primarily developed for the purpose of allowing the mirror to oscillate automatically when the turn signal is in operation, and further having the side mirror that oscillates automatically in correspondence with the direction of the turn signal.

Therefore, it can be appreciated that there exists a continuing need for a new and improved oscillating side view mirror which can be used for allowing the mirror to oscillate automatically when the turn signal is in operation, and further having the side mirror that oscillates automaticall in correspondence with the direction of the turn signal. In this regard, the present invention substantially fulfills this need.

SUMMARY OF THE INVENTION

In view of the foregoing disadvantages inherent in the known types of side view mirrors now present in the prior art, the present invention provides an improved oscillating side view mirror. As such, the general purpose of the present invention, which will be described subsequently in greater detail, is to provide a new and improved oscillating side view mirror and method which has all the advantages of the prior art and none of the disadvantages.

To attain this, the present invention essentially comprises a mirror housing that has a generally bullet-shape is supported on a side of a vehicle by a generally rectangular support arm. The support arm and the mirror housing, each have a hollow interior. A motor is mounted within the hollow interior of the support arm. The motor has a drive wheel positioned on a upper side. The motor has a pair of contact wires projecting from one side. The pair of contact wires are capable of being an electrical communication with the turn signal of the vehicle by a relay. A mirror is positioned within the mirror housing for viewing objects to the side and rear of the vehicle. The mirror is supported within the housing by a backing plate with a rotation rod extending therethrough. The rotation rod is attached at the upper end to the housing. The rotation rod is attached at a lower end to a semi-circular oscillating member. Lastly, a generally rectangular arm is attached to the drive wheel of the motor by a rear pivot pin. The arm is attached to a rear of the oscillating member with a front pivot pin. The arm is capable of causing the mirror to rotate back and forth within the mirror housing. The arm's movement is caused when the motor is activated by the turn signal of the vehicle. Whereby, when the turn signal is switched on the relay will send an electrical current through the rod to the motor of the mirror on the side of the vehicle corresponding to the direction of the turn signal. The motor, receiving the current, will cause the mirror to oscillate back and forth for reduction of a particular blind spot.

There has thus been outlined, rather broadly, the more important features of the invention in order that the detailed description thereof that follows may be better understood and in order that the present contribution to the art may be better appreciated. There are, of course, additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of descriptions and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

It is therefore an object of the present invention to provide a new and improved oscillating side view mirror which has all of the advantages of the prior art side view mirrors and none of the disadvantages.

It is another object of the present invention to provide a new and improved oscillating side view mirror which may be easily and efficiently manufactured and marketed.

It is further object of the present invention to provide a new and improved oscillating side view mirror which is of durable and reliable constructions.

An even further object of the present invention is to provide a new and improved oscillating side view mirror which is susceptible of a low cost of manufacture with regard to both materials and labor, and which accordingly is then susceptible of low prices of sale to the consuming public, thereby making such oscillating side view mirror economically available to the buying public.

Still yet another object of the present invention is to provide a new and improved oscillating side view mirror which provides in the apparatuses and methods of the prior art some of the advantages thereof, while simultaneously overcoming some of the disadvantages normally associated therewith.

Even still another object of the present invention is to provide a mirror that oscillate automatically when the turn signal is in operation, and further having the side mirror that oscillates automatically in correspondence with the direction of the turn signal.

Lastly, it is an object of the present invention to provide a new and improved oscillating side view mirror including a mirror housing that is supported on a side of a vehicle by a generally rectangular support arm. A motor is mounted within a hollow interior of the support arm, and a drive wheel. The motor has a pair of contact wires that are in electrical communication with a turn signal of the vehicle by a relay. A mirror is positioned within the housing. The mirror is supported within the housing by a backing plate with a rotation rod extending therethrough. Lastly, a generally rectangular arm is attached to the drive wheel of the motor, and a oscillating member that is attached to the rotation rod. The arm is capable of causing the mirror to rotate back and forth within the mirror housing, when the motor is activated by a turn signal of the vehicle sending an electrical current through the relay.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

The same reference numerals refer to the same parts through the various Figures.

DESCRIPTION OF THE PREFERRED EMBODIMENT

Figure 1:
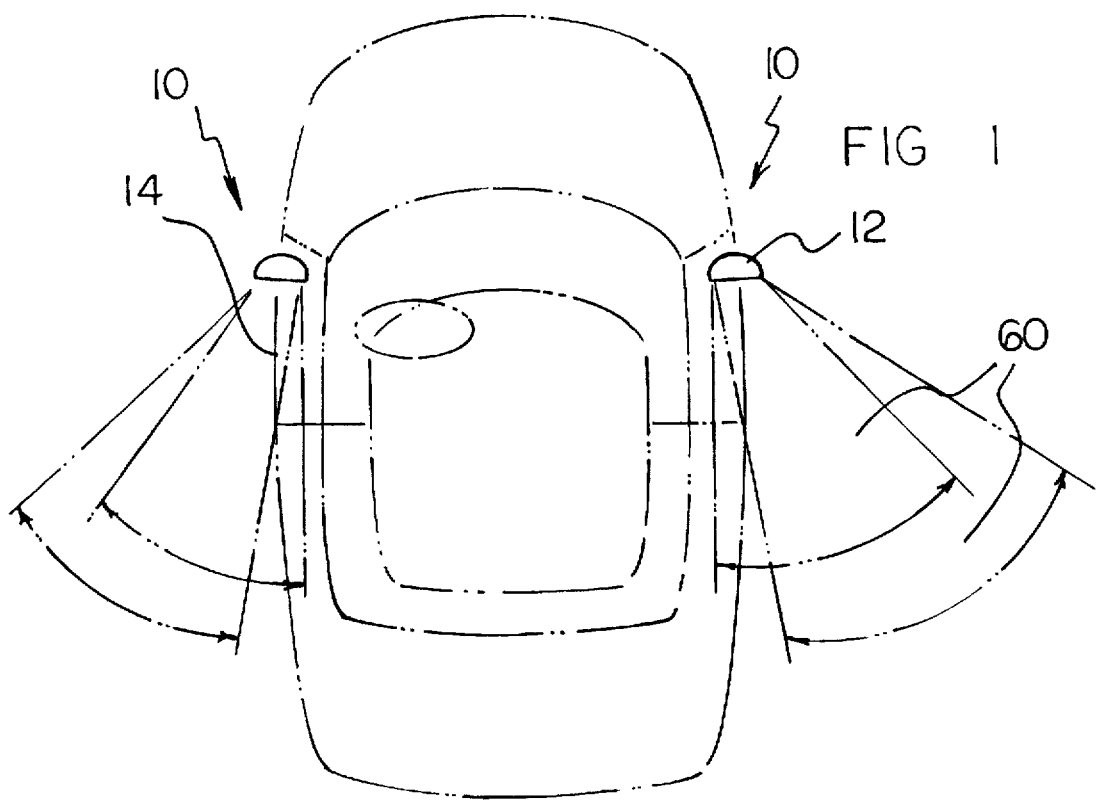
FIG. 1 is a perspective view of the preferred embodiment of the oscillating side view mirror in an operable configuration.

With reference now to the drawings, and in particular to FIG. 1 thereof, the preferred embodiment of the new and improved oscillating side view mirror embodying the principles and concepts of the present invention and generally designated by the reference numeral 10 will be described.

The present invention, the oscillating side view mirror 32 is comprised of a plurality of components. Such components in their broadest context include a housing, a support arm and a motor. Such components are individually configured and correlated with respect to each other so as to attain the desired objective.

Figure 3:
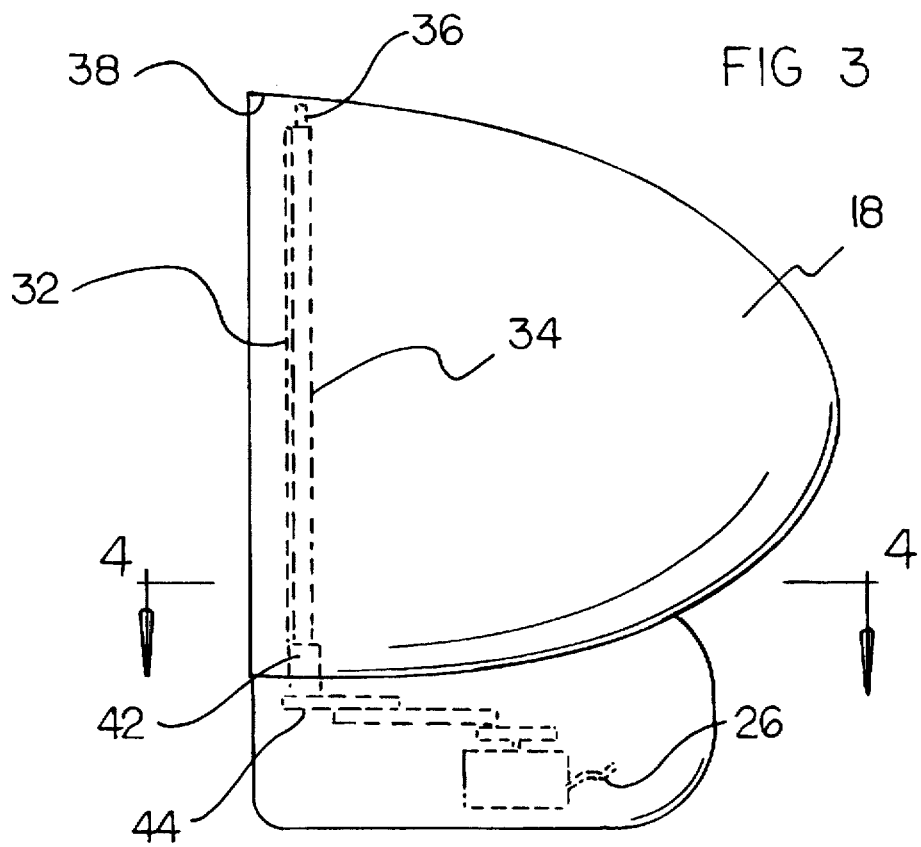
FIG. 3 is a side elevational view of the present invention as shown in FIG. 1.

Specifically, the present invention includes a mirror housing 12. The housing has a generally bullet-shape, as seen in FIG. 3. The mirror housing is supported on a side of a vehicle 14 by a generally rectangular support arm 16. The support arm and the mirror housing, each have a hollow interior 18. The mirror housing and the support arm are both formed from a thermoplastic resin.

Figure 5:
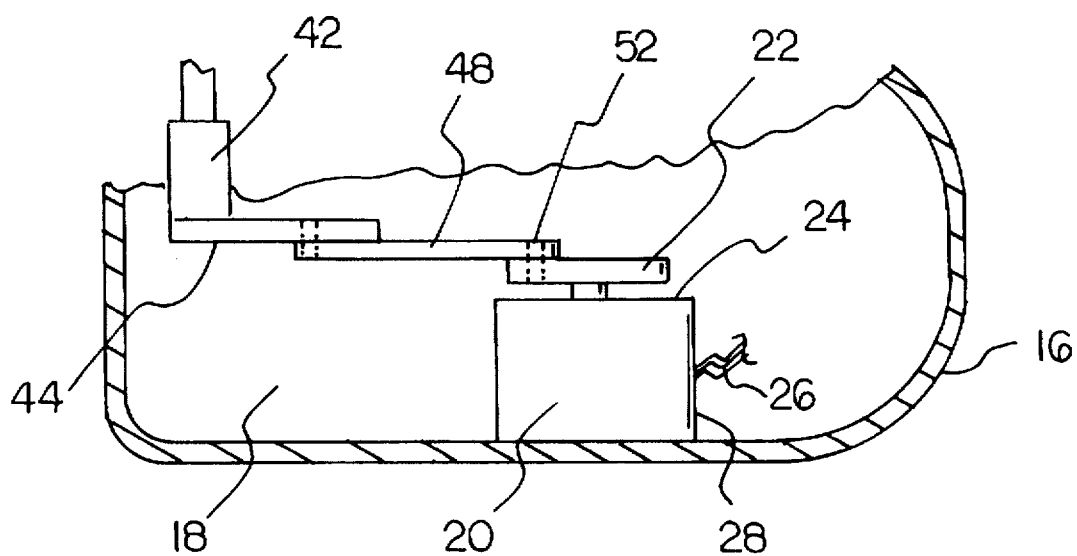
FIG. 5 is a cross sectional cut-away view of the support arm taken along line 5—5 of FIG. 4.
Figure 6:
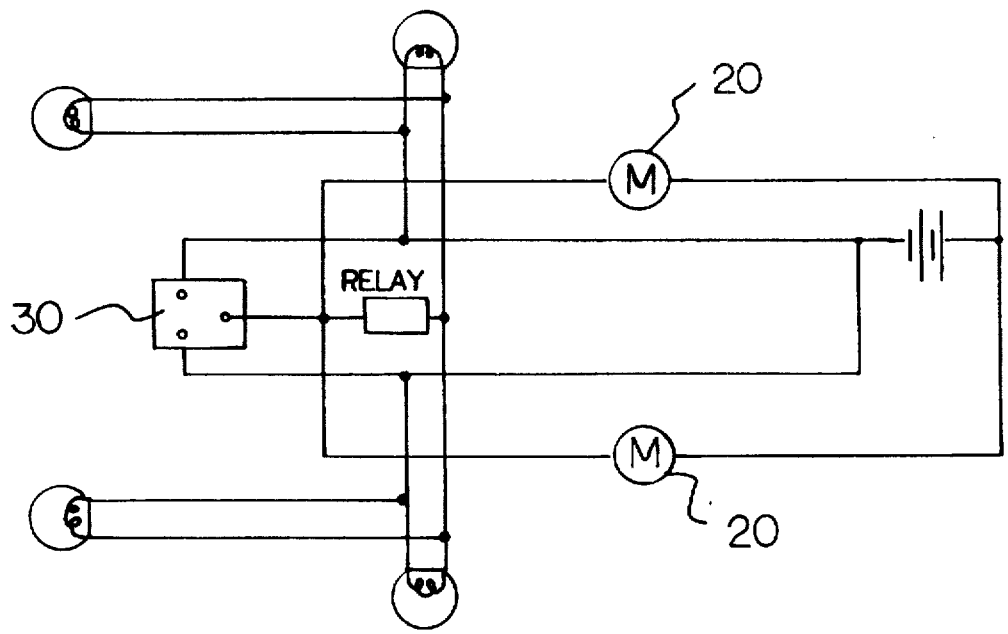
FIG. 6 is a schematic of the electrical connection of the motor, a relay, a turn signal switch, a turn signal and an electric source according to the present invention.

As best illustrated in FIG. 5, a motor 20 is mounted within the hollow interior of the support arm. The motor has a drive wheel 22 positioned on an upper side 24. The motor has a pair of contact wires 26 projecting from one side 28. The pair of contact wires are in electrical communication with a turn signal 30 of the vehicle by a relay, as shown in FIG. 6. The motor is a commercially available motor of the type currently being used in today's market.

Figure 2:
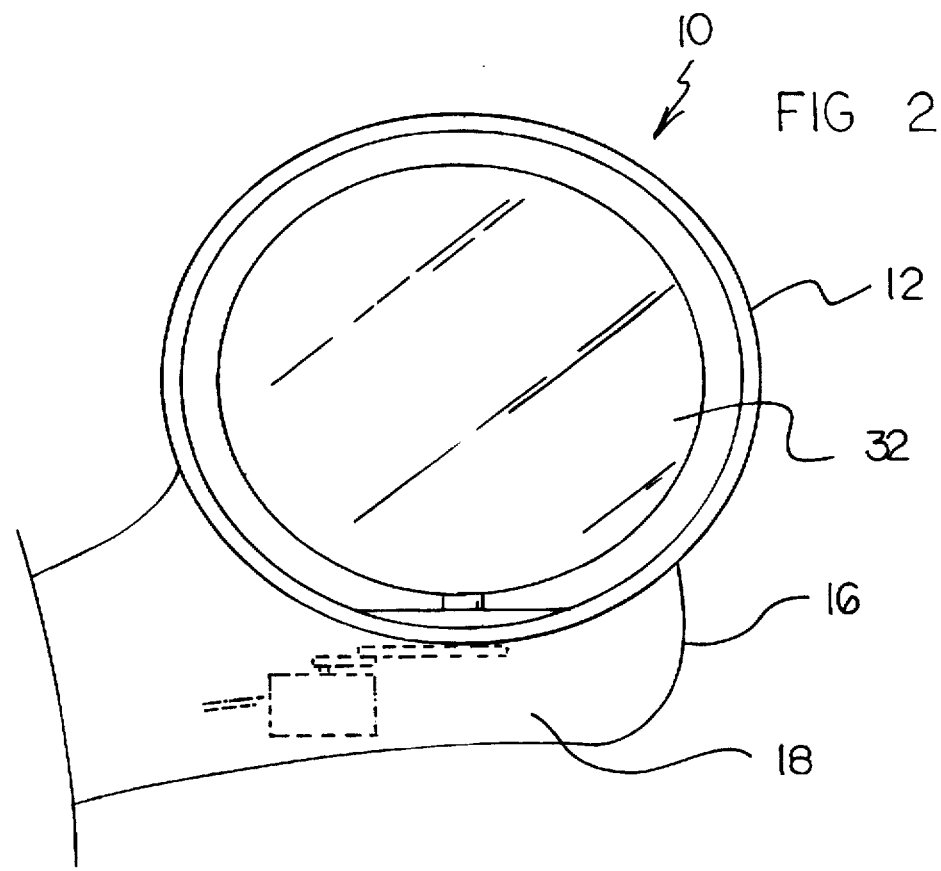
FIG. 2 is a perspective view of the preferred embodiment of the oscillating side view mirror constructed in accordance with the principles of the present invention.

Also, a mirror 32 is positioned within the mirror housing, as seen in FIGS. 2 and 3. The mirror allows viewing of objects to the side and rear of the vehicle. The mirror is supported within the housing by a backing plate 34, with a rotation rod 36 extending therethrough. As seen in FIG. 3, the rotation rod is attached to an upper end 38 of the housing 12. The rotation rod is attached at a lower end 42 to a semi-circular oscillating member 44, as seen in FIG. 5. The rotation rod is formed of a metal or metal alloy. The backing plate may be a metal or rigid plastic. The oscillating member is formed of a thermoplastic resin.

Figure 4:
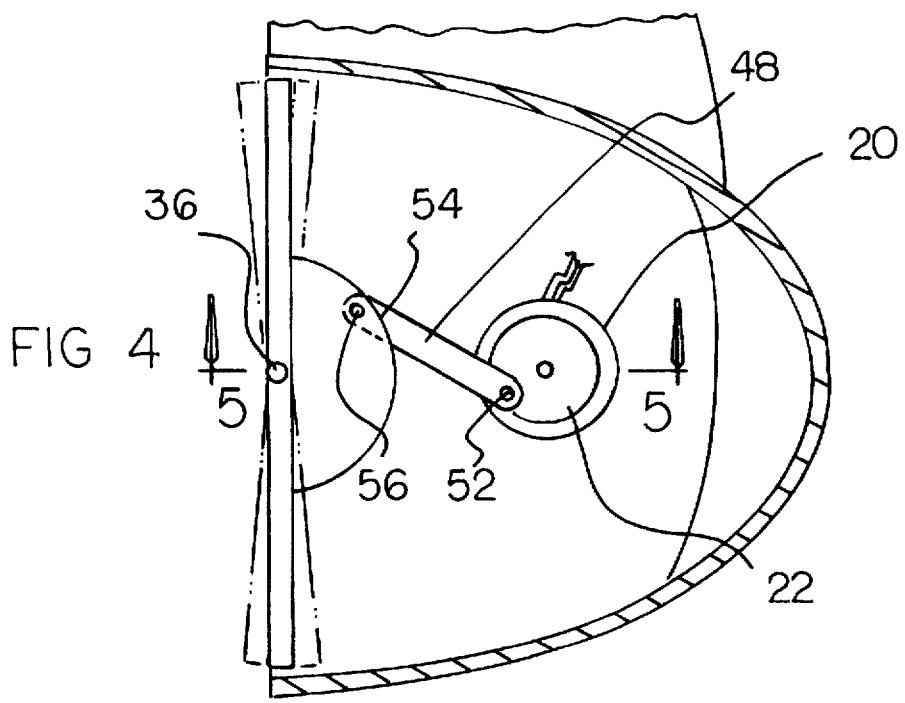
FIG. 4 is a cross sectional top view of the present invention taken along line 4—4 of FIG. 3.

Lastly, a generally rectangular arm 48 is attached to the drive wheel 24 of the motor by a rear pivot pin 52. The arm is attached near a rear 54 of the oscillating member 44 with a front pivot pin 56 as seen in FIG. 4. The arm is capable of causing the mirror 32 to rotate back and forth within the mirror housing 12. The arm's movement is caused by the motor 20 being activated by the turn signal of the vehicle. Whereby, when the turn signal is switched on, the relay will send an electrical current through the wires to the motor of the mirror on a corresponding side of the vehicle. In response to the turn signal, the motor receiving the current and causes the mirror to oscillate back and forth. The mirror oscillation reduces a particular blind spot. As seen in FIG. 1, the fields of vision 60 that are automatically viewable when the mirror is operational and oscillates back and forth.

The oscillating side view mirror of the present invention is automatically activated by the turn indicator of the vehicle. When the oscillating side mirror is activated, the mirror sweeps the rear blind spot of the vehicle. The present invention eliminates the unsafe present right mirror currently being used in vehicles now. In operation, the driver of the vehicle activates the oscillating mirror automatically when the turn signal is used. The oscillating mirror of the present invention may be placed on the left and right sides of the vehicle. When the turn signal indicates a left turn, the oscillating side mirror of the left side of the vehicle becomes operational. When the turn signal indicates a right turn, the oscillating side mirror of the right side of the vehicle becomes operational. When the turn signal is no longer in use, the mirror remains in a set position, preset by the vehicle's oscillator.

As to the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by LETTERS PATENT of the United States is as follows:

1. An oscillating side view mirror for safer lane changing of a vehicle comprising in combination:

a mirror housing having a generally bullet-shape being supported on a side of a vehicle by a generally rectangular support arm, the support arm and the mirror housing each having a hollow interior;

a motor being mounted within the hollow interior of the support arm, the motor having a drive wheel positionable on an upper side thereof, the motor having a pair of contact wires projecting from one side thereof, the pair of contact wires capable of being in electrical communication with a turn signal of the vehicle by a relay;

a mirror being positionable within the mirror housing for viewing objects to the side and rear of the vehicle, the mirror being supported within the housing by a backing plate with a rotation rod extending therethrough, the rotation rod being attached at an upper end to the housing, the rotation rod being attached at a lower end to a semi-circular oscillating member; and a generally rectangular arm being attached to the drive wheel of the motor by a rear pivot pin, the arm being attached near a rear of the oscillating member with a front pivot pin, the arm being capable of causing the mirror to rotate back and forth within the mirror housing, the arm's movement being cause by the motor being activated by the turn signal of the vehicle, whereby, when the turn signal being switched on the relay will send an electrical current through the wires to the motor of the mirror on the side of the vehicle corresponding to the direction of the turn signal, the motor receiving the current will cause the mirror to oscillate back and forth for reduction of a particular blind spot.

2. An oscillating side view mirror comprising:

a mirror housing being supported on a side of a vehicle by a generally rectangular support arm;

a motor being mounted within a hollow interior of the support arm and having a drive wheel, the motor having a pair of contact wires of being in electrical communication with a turn signal of the vehicle by a relay;

a mirror being positioned within the mirror housing, and being supported within the housing by a backing plate with a rotation rod extending therethrough, the mirror being capable of allowing a person in the vehicle to view objects to the side and rear of the vehicle; and a generally rectangular arm being attached to the drive wheel of the motor, and an oscillating member being attached to the rotation rod, the rotation rod of the backing plate that supports the mirror attached at an upper end to the housing and a lower end is attach to the oscillating member, the arm being capable of causing the mirror to rotate back and forth within the mirror housing when the motor being activated by the turn signal of the vehicle sends an electrical current through the relay.

3. The oscillating side view mirror as set forth in claim 2, wherein the mirror housing having a hollow interior.

4. The oscillating side view mirror as set forth in claim 2, wherein the drive wheel being on an upper side of the motor.

5. The oscillating side view mirror as set forth in claim 2, wherein a rear pivot pin attaches the arm to the drive wheel while a front pivot pin attaches the arm near a rear of the oscillating member.

6. The oscillating side view mirror as set forth in claim 5, wherein, when the turn signal being switched on the relay will send the electrical current through the wires to the motor of the mirror on the side of the vehicle corresponding to the direction of the turn signal, and the arm being moved by the drive wheel activated by the motor will cause the mirror to oscillate back and forth for reduction of a particular blind spot.

* * * * *